US008061053B2

(12) United States Patent　　(10) Patent No.: US 8,061,053 B2
Gillan　　(45) Date of Patent: Nov. 22, 2011

(54) MULTIPLE STAGE MECHANICAL DRIFT TOOL

(75) Inventor: Peter Gillan, Aberdeenshire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 70 days.

(21) Appl. No.: 12/425,411

(22) Filed: Apr. 17, 2009

(65) Prior Publication Data

US 2010/0263441 A1　　Oct. 21, 2010

(51) Int. Cl.
E21B 47/08 (2006.01)
G01B 5/12 (2006.01)
(52) U.S. Cl. .......................................... 33/544; 33/544.4
(58) Field of Classification Search ................ 33/1 H, 33/542, 542.1, 543, 543.1, 544, 544.1, 544.2, 33/544.3, 544.4, 544.5; 73/152.54
See application file for complete search history.

(56) References Cited

U.S. PATENT DOCUMENTS

| | | | | |
|---|---|---|---|---|
| 953,282 | A | * | 3/1910 | Nash .............................. 33/544.6 |
| 2,925,660 | A | * | 2/1960 | Raulins ........................ 33/544.3 |
| 3,349,610 | A | * | 10/1967 | Georges ............................ 73/84 |
| 6,283,208 | B1 | * | 9/2001 | George et al. ............... 166/255.3 |

FOREIGN PATENT DOCUMENTS

JP　　04313003 A　*　11/1992

OTHER PUBLICATIONS

Derwent 2002-348536 abstract of KR 2001064958 A, titled "Variable mandrel for measuring inner diameter", published Jul. 11, 2001, Inventor: Kang et al., Assignee: Korea Telecom [KTKT].*

* cited by examiner

Primary Examiner — R. A. Smith
(74) Attorney, Agent, or Firm — Matthias Abrell; George Georgellis

(57) ABSTRACT

A downhole tool for measuring a diameter of a borehole that includes a mandrel and a collet is disclosed. The collet is disposed about the mandrel that includes a tapered surface formed on an outside surface of the mandrel that increases in diameter across a portion of the mandrel. The collet includes deflectable arm portions with a borehole engagement portion that are adapted to engage the borehole. The borehole engagement portions in-turn may then engage the tapered surface or the steps of the mandrel, such that the collet can move with respect to the mandrel. With this movement of the collet, the outer diameter of the collet may progressively decrease, thereby also decreasing the outer diameter of the downhole tool.

20 Claims, 4 Drawing Sheets

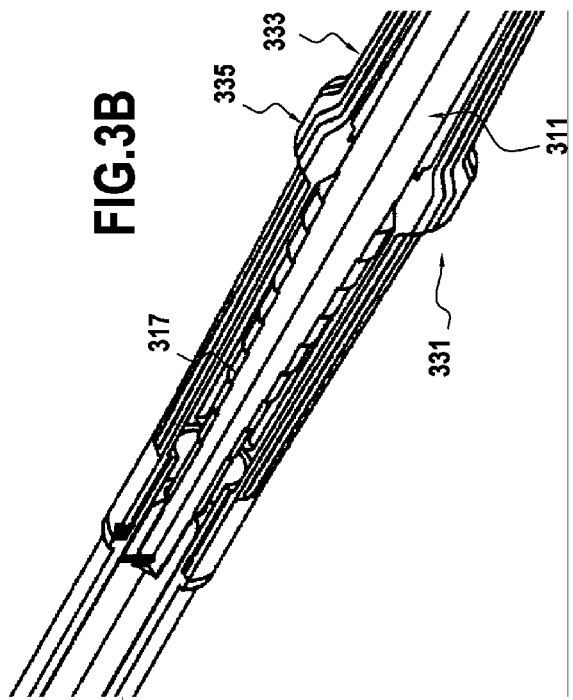
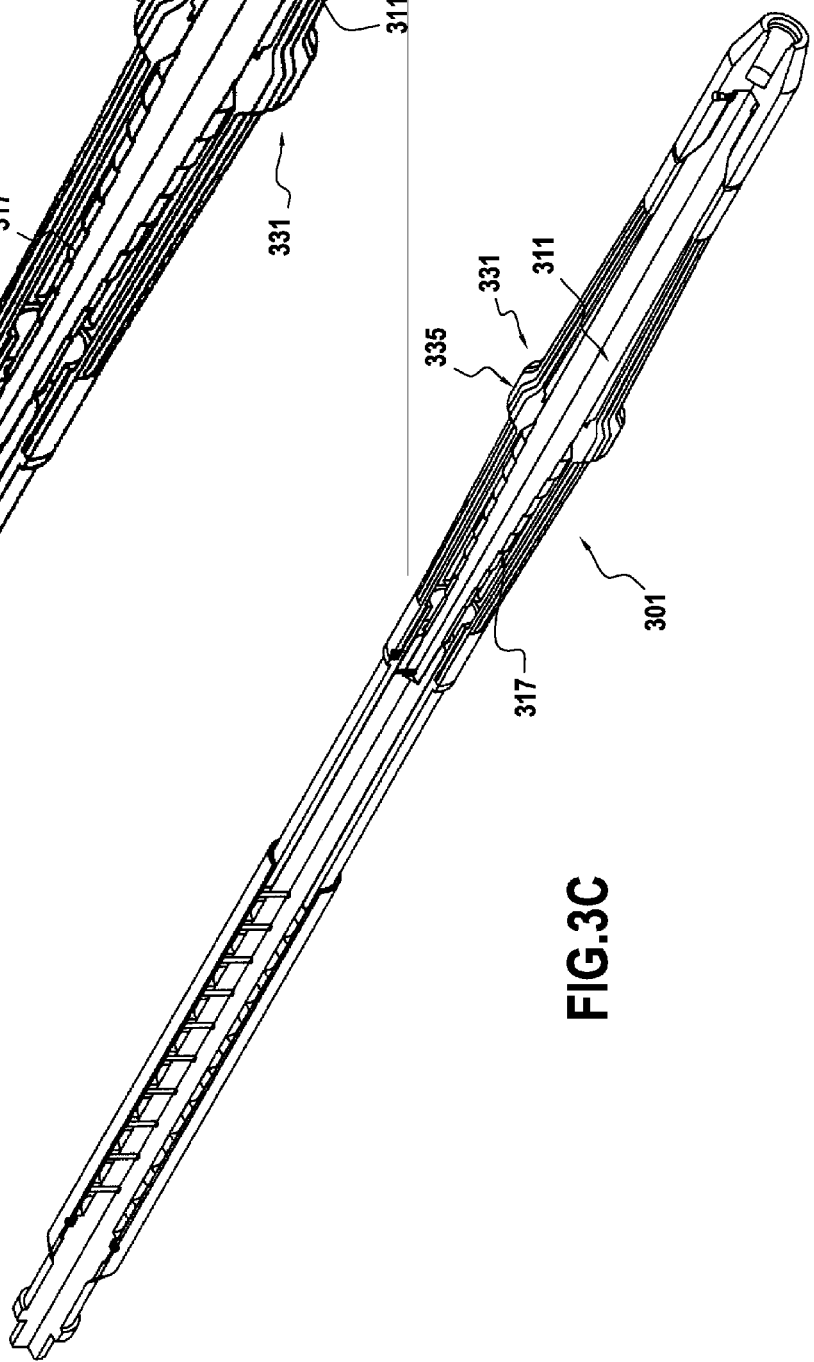

MULTIPLE STAGE MECHANICAL DRIFT TOOL

FIELD OF DISCLOSURE

Embodiments disclosed herein generally relate to a downhole tool. More specifically, embodiments disclosed herein relate to a downhole drift tool designed for use within the oilfield industry.

BACKGROUND

In oilfield exploration and production operations, prior to running any tools into a borehole, it is a common industry practice to perform a drift of the borehole. Drifting is a method used to measure and verify the inside diameter of a pipe or other cylindrical tool that may be disposed in the borehole. Typically, a cylinder or pipe of a known diameter, often referred to as a rabbit, is pulled through the pipe or cylindrical tool disposed downhole in the borehole. The outside diameter of the rabbit determines the maximum working diameter of the borehole. The drift diameter, or inner diameter, is used by well planners to determine what size tools or equipment may be disposed into the borehole. Drifting is also used to establish that the borehole is clear of obstruction, identify any particular landmarks within the borehole, and/or ensure that tools or other downhole assemblies will be able to travel through the borehole to reach specified depths.

Typically, the drift, a cylinder or pipe of a known diameter (e.g., a downhole tool), is deployed into the borehole. If the drift is obstructed, efforts are made to move the drift through the obstruction. However, if the drift will not pass the obstruction, the drift and tools must be recovered to the surface, and a drift of a smaller diameter is deployed downhole into the borehole. In some cases, multiple drift changes are required. This technique may also be used to check known landmarks within the borehole, such as nipple profiles or tubular crossovers. It is common to include landing nipples in most wells and boreholes at predetermined intervals to enable the installation of flow-control devices, such as plugs and chokes.

However, the redeployment of multiple and different drifts may be an extremely protracted sequence of events. This may result in additional costs, especially in a rig environment, as such operations may increase the time until any production is received from the well.

SUMMARY OF DISCLOSURE

In one aspect, one or more embodiments of the present invention relate to a downhole tool for measuring a diameter within a borehole, comprising: a mandrel having a first end and a second end with an axis defined therethrough, wherein a tapered surface is formed on an outside surface of the mandrel such that a first end of the tapered surface has a larger diameter than a second end of the tapered surface; and a collet disposed about the mandrel such that the collet is configured to move along the axis of the mandrel with respect to the mandrel in a direction from the first end of the mandrel to the second end of the mandrel.

In one aspect, one or more embodiments of the present invention relate to a method of measuring a diameter within a borehole using a downhole tool comprising a mandrel having a first end, a second end, and an axis defined therethrough; and a collet disposed about the mandrel, the method comprising: disposing the downhole tool into the borehole such that the first end of the mandrel enters the borehole before the second end of the mandrel; and applying a force to the second end of the downhole tool, upon the downhole tool contacting an obstruction in the borehole, wherein, based on the force applied to the downhole tool, the collet moves along the axis of the mandrel with respect to the mandrel such that an outer diameter of the downhole tool decreases.

In one aspect, one or more embodiments of the present invention relate to a method of manufacturing a downhole tool for measuring a diameter within a borehole, comprising: providing a mandrel having a first end and a second end with an axis defined therethrough, forming a tapered surface on an outside surface of the mandrel such that a first end of the tapered surface has a larger diameter than a second end of the tapered surface; and disposing a collet about the mandrel such that the collet is configured to move along the axis of the mandrel with respect to the mandrel in a direction from the first end of the mandrel to the second end of the mandrel.

Other aspects and advantages of the present invention will be apparent from the following description and the appended claims.

BRIEF DESCRIPTION OF DRAWINGS

FIGS. 3A-3C show multiple perspective and cutaway views of a downhole tool in accordance with embodiments disclosed herein.

DETAILED DESCRIPTION

Figure 1:
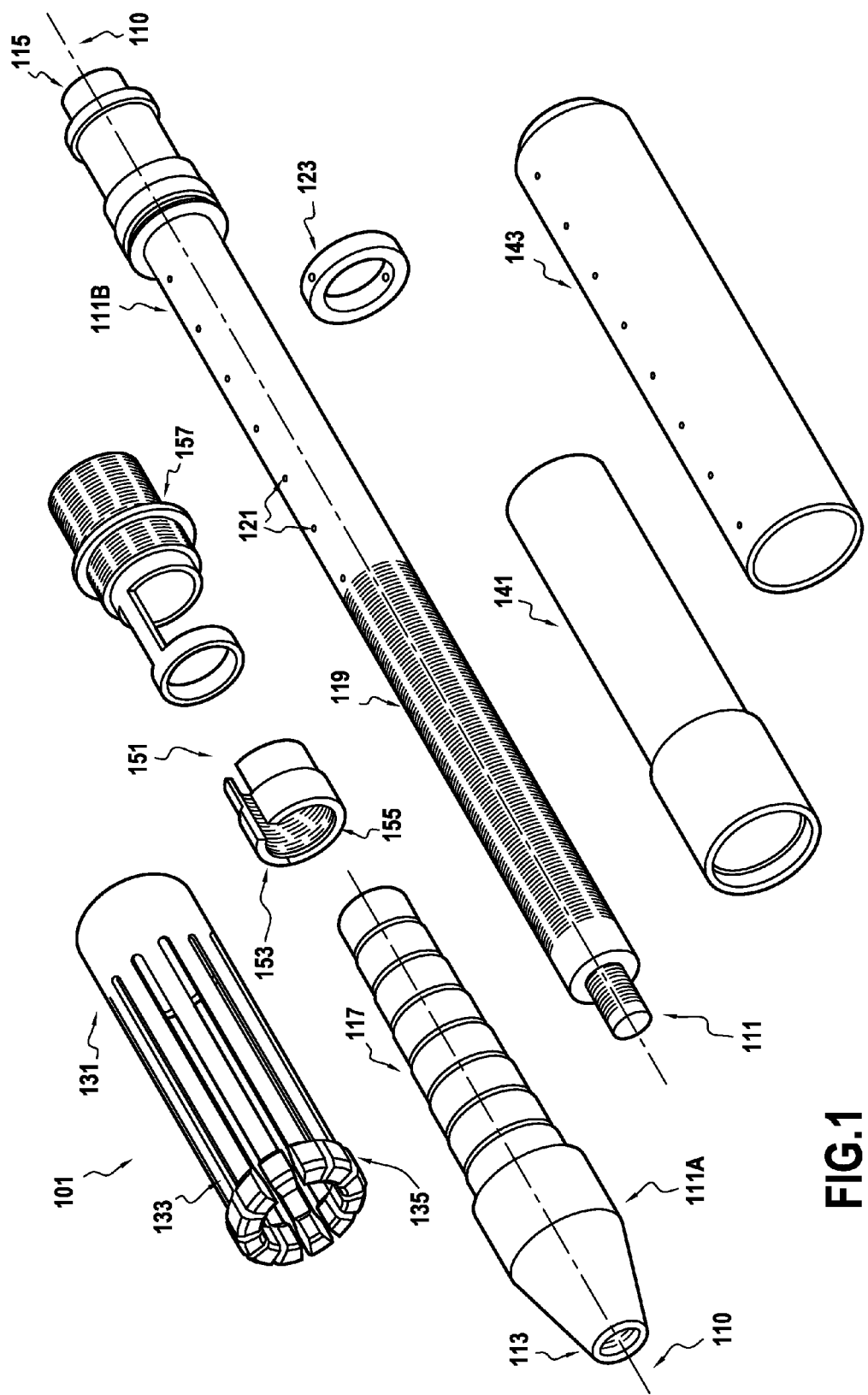
FIG. 1 shows an exploded view of a downhole tool in accordance with embodiments disclosed herein.

Specific embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

In one aspect, embodiments disclosed herein generally relate to a downhole tool to be disposed into a borehole and/or measure a diameter within a borehole. The downhole tool includes a mandrel and a collet. The mandrel will have a first end and a second end with an axis defined therethrough. The mandrel will also have a tapered surface formed on an outside surface of the mandrel, in which the tapered surface may increase in diameter across a portion of the mandrel. Further, the collet of the downhole tool will be disposed about the mandrel and will be configured to move with respect to the mandrel. Specifically, the collet may be configured to move along the axis of the mandrel with respect to the mandrel, and the collet may be configured to move in a direction from the first end of the mandrel to the second end of the mandrel.

The tapered surface of the mandrel may also include a plurality of steps, in which the steps may incrementally decrease in diameter. Further, the collet may include deflectable arm portions with a borehole engagement portion attached to each of the deflectable arm portions. The borehole engagement portions may then engage the tapered surface of the mandrel, and particularly the steps of the mandrel (if present). As such, as the collet moves with respect to the mandrel, the borehole engagement portions of the collet may also move across the steps of the tapered surface. With this movement of the collet, the outer diameter of the collet may progressively decrease, thereby also decreasing the outer diameter of the downhole tool.

Referring now to FIG. 1, an exploded view of a downhole tool 101 in accordance with one or more embodiments is shown. The downhole tool 101 includes a mandrel 111 and a collet 131, in which the mandrel 111 has an axis 110 defined therethrough. As shown, the mandrel 111 may be formed as a first portion 111A and a second portion 111B; however, those having ordinary skill in the art will appreciate that the mandrel may also be formed using more than two portions, or the mandrel may instead be formed as one structure without independent portions. In this embodiment, the first portion 111A and the second portion 111B are configured to attach to each other, such as by using a threaded connection shown in FIG. 1.

The mandrel 111 of the downhole tool 101 has a first end 113 and a second end 115 and includes a tapered portion 117 formed on an outside surface thereof. In this embodiment, the tapered portion 117 of the mandrel 111 is formed using a plurality of steps. However, those having ordinary skill in the art will appreciate that the present disclosure is not so limited. In one or more embodiments, the tapered portion may instead be formed using, for example, a smooth surface or a surface with notches formed therein. Regardless, the tapered portion 117 of the mandrel 111 is formed such that the tapered portion 117 decreases in diameter. Particularly, as shown in FIG. 1, the tapered portion 117 decreases in diameter in a direction from the first end 113 of the mandrel 111 to a second end 115 of the mandrel 111.

The collet 131 of the downhole tool 101 is then sized such that the collet 131 may be disposed about the mandrel 111. The collet 131, as shown, may include a plurality of arm portions 133 and a plurality of borehole engagement portions 135. In the embodiment shown, the borehole engagement portions 135 are disposed at the ends of the plurality of arm portions 133. However, in other embodiments, one or more of the borehole engagement portions may be disposed at other locations of the arm portions of the collet, as desired.

When the collet 131 is disposed about the mandrel 111, the collet 131 is configured to move with respect to the mandrel 111. Particularly, the collet 131 may move along the axis 110 of the mandrel 111 with respect to the mandrel 111. As such, as the collet 131 moves with respect to the mandrel 111, the borehole engagement portions 135 may engage and move across the tapered surface 117 of the mandrel 111. For example, as shown in FIG. 1, the tapered surface 117 includes steps formed thereon. The arm portions 133 of the collet 131 may be able to deflect radially inwards and outwards with respect to the axis 110 of the mandrel, thereby also enabling the borehole engagement portions 135 attached to the arm portions 133 to also be able to deflect radially inwards and outwards. As the collet 131 moves with respect to the mandrel 111, the borehole engagement portions 135 will move across the tapered portion 117 of the mandrel 111, in which the borehole engagement portions 135 may also be able to deflect inwards. This deflection and movement of the borehole engagement portions 135 will enable an outer diameter of the downhole tool 101 to decrease. This process will be discussed in more detail below.

Referring still to FIG. 1, the mandrel 111 of the downhole tool 101 may include a mechanism to enable movement of the collet 131 in one direction across the mandrel 111, but prevent movement of the collet 131 in the other direction across the mandrel 111.

Particularly, this mechanism may enable the collet 131 to move in the direction from the first end 113 of the mandrel 111 to the second end 115 of the mandrel 111, but may prevent the collet 131 to move in the direction from the second end 115 of the mandrel 111 to the first end 113 of the mandrel 111.

As such, in one or more embodiments, to enable such selective movement of the collet 131 with respect to the mandrel 111, the mandrel 111 of the downhole tool 101 may include a ratcheting mechanism 151. Specifically, the ratcheting mechanism 151 shown may include a bushing 153 and a socket 157. The bushing 153 may be formed to fit, at least partially, within the socket 157. Further, the bushing 153 may also be formed to move, at least partially, within the socket 157 when disposed in and engaged with the socket 157. As such, the bushing 153 of the ratcheting mechanism 151 includes a female groove 155 formed on an inside surface thereof. Similarly, the mandrel 111 may include a male groove 119 formed on an outer surface thereof.

The male groove 119 of the mandrel 111 is configured to engage with the female groove 155 of the bushing 153 such that the bushing 153, and, thereby, the ratcheting mechanism 151 when connected with the socket 157, may move in the direction from the first end 113 of the mandrel 111 to the second end 115 of the mandrel 111, but is prevented from movement in the direction from the second end 115 of the mandrel 111 to the first end 113 of the mandrel 111. The ratcheting mechanism 151 may then be connected to the collet 131, e.g., having the socket 157 of the ratcheting mechanism 151 connect to the collet 131 through a threaded connection as shown. This connection of the ratcheting mechanism 151 with the collet 131 may then enable the collet 131 to only move in the direction from the first end 113 of the mandrel 111 to the second end 115 of the mandrel 111. However, those having ordinary skill in the art will appreciate that other mechanisms may also be used to enable the selective movement of the collet with respect to the mandrel, such as by incorporating the use of a pin, a locking device, or a one-way clutch that enables only movement in one direction across the mandrel.

Referring still to FIG. 1, the downhole tool 101 may further include one or more shear pins (shown later in FIG. 2). In the embodiment shown, the shear pins may be disposed through the mandrel 111 (such as at shear pin hole locations 121) and into a disc 123. The shear pins disposed through mandrel 111 may be used to provide resistance to the movement of the collet 131 with respect to the mandrel 111. For example, as shown, the downhole tool 101 may include an inner sleeve 141 and an outer sleeve 143, in which each of these sleeves 141 and 143 may be formed to be disposed about the mandrel 111. The inner sleeve 141 may then attach to the collet 131, such as through the attachment of the inner sleeve 141 to the ratcheting mechanism 151 and the ratcheting mechanism 151 attachment to the collet 131, and the outer sleeve 143 may abut a portion of and/or attach to the mandrel 111.

With this configuration, as the collet 131 moves with respect to the mandrel 111, the inner sleeve 141 will move with respect to the outer sleeve 143. The discs 123 attached to the mandrel 111 may be disposed in a gap formed between the outer sleeve 143 and the mandrel 111, in which the inner sleeve 141 may engage the discs 123 during movement.

Specifically, as the inner sleeve 141 moves in the direction from the first end 113 of the mandrel 111 to the second end 115 of the mandrel 111, an end of the inner sleeve 141 will abut and engage the discs 123 having the shear pins attached thereto. The shear pins may then provide resistance against the movement of the inner sleeve 141. However, with enough force, the inner sleeve 141 may overcome the shear strength of the shear pins, thereby shearing one or more of the shear pins to enable further movement of the inner sleeve 141 with respect to the outer sleeve 143 and the mandrel 111. Each of the shear pins may be disposed at equal increments from each other, as shown, or may be disposed at unequal increments from each other, as desired. Further, each of the shear pins may be formed to have similar shear strengths, or the shear pins may alternatively be formed to have different respective shear strengths, as desired.

Figure 2A:
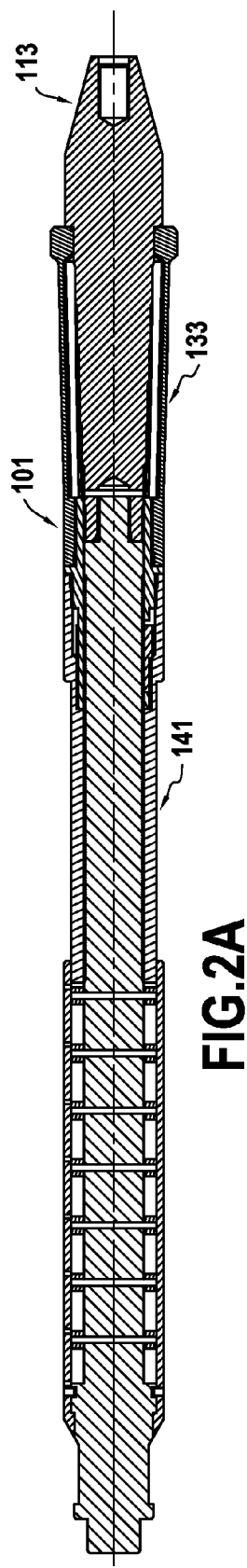
FIGS. 2A-2C show multiple cross-sectional views of a downhole tool in accordance with embodiments disclosed herein.
Figure 2B:
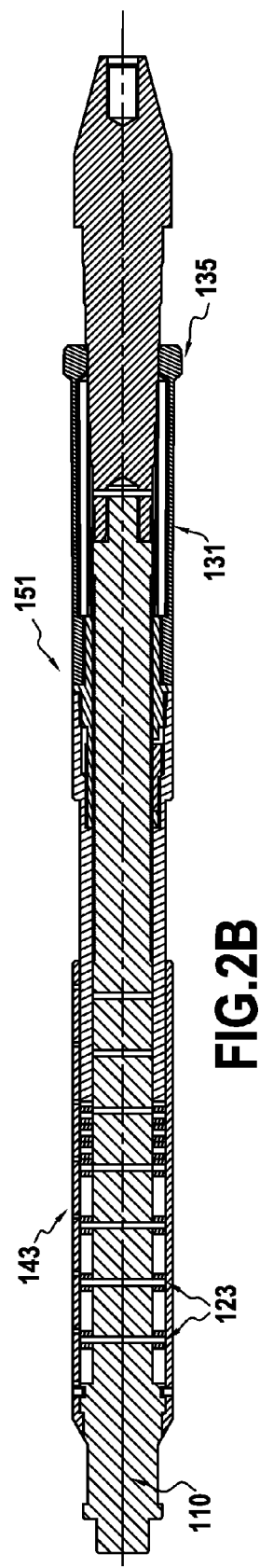
Figure 2C:
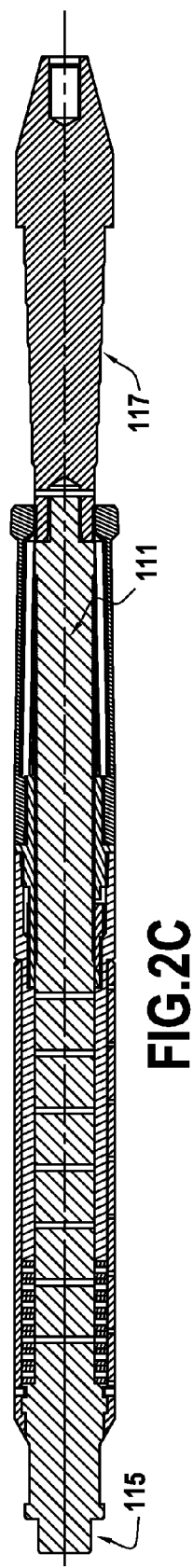

Referring now to FIGS. 2A-2C, cross-sectional views of the downhole tool 101 in accordance with one or more embodiments is shown. As discussed above, the downhole tool 101, may be disposed downhole, such as to drift a borehole. When drifting a borehole, the downhole tool 101 may be specifically used to measure the diameter of the borehole disposed therein.

For example, when disposed into the borehole, the downhole tool 101 may have the initial fully extended configuration and fully developed outer diameter, as shown in FIG. 2A. As the downhole tool 101 though continues further into the borehole, the diameter of the borehole may decrease in size. As such, the downhole tool 101 may contact and interfere with the wall or surface of the borehole because the outer diameter of the downhole tool 101 reaches about the same size of the inner diameter of the borehole, thereby preventing further movement of the downhole tool 101 within the borehole. A force may then be applied to the downhole tool 101, such as to the second end 115 of the downhole tool 101, to move the collet 131 with respect to the mandrel 111 such that the outer diameter of the downhole tool 101 decreases.

When a force is applied to the downhole tool 101, assuming the force is large enough to overcome the shear strength of the shear pins, this enables the borehole engagement portions 135 to move along the tapered surface 117 of the mandrel 111. Specifically, the borehole engagement portions 135 may contact the surface of the borehole, in which the force applied to the downhole tool 101 will push the mandrel 111 such that the borehole engagement portions 135 move along the tapered surface 117. During this movement, the inner sleeve 141, which is connected to the collet 131, will contact the discs 123 having the shear pins attached thereto. As described above, when the force applied to the downhole tool 101 overcomes the shear strength of the shear pins, the shear pins will shear and the discs 123 attached thereto will move along the mandrel 111.

Accordingly, with the movement of the collet 131 with respect to the mandrel 111, the outer diameter of the collet 131, and, thereby, the outer diameter of the downhole tool 101, will decrease. For example, as shown in FIG. 2B, the collet 131 has partially moved along the tapered surface 117 of the mandrel 111. As such, through the engagement of the borehole engagement portions 135 with the tapered surface 117 of the mandrel 111, this enables the outer diameter of the collet 131 to decrease in size. This decrease in the outer diameter of the collet 131 is also dependent upon the shearing of the shear pins disposed through the mandrel 111, in which three shear pins are particularly shown to have sheared in the movement of the collet 131. FIG. 2C shows the downhole tool 101 after the collet 131 has collapsed in diameter. Specifically, the borehole engagement portions 135 have moved across the entire tapered surface 117 of the mandrel 111, causing the outer diameter of the collet 131, and, thus, the outer diameter of the downhole tool 101, to reach a minimum.

In embodiments in which the tapered surface of the downhole tool includes steps formed thereon, as shown in FIGS. 1 and 2A-2C, the steps may be formed to have incremental decreases in diameter. For example, in one or more embodiments, the steps of the tapered surface may be formed to have an incremental decrease in diameter of about 0.100 in (2.54 mm). Further, in one or more embodiments, the steps of the tapered surface may be formed to have an incremental decrease in diameter of about 0.050 in (1.27 mm). Further, other incremental decreases in diameter based upon the spacing between the shear pins in the mandrel and/or the slope of the tapered surface. Those having ordinary skill in the art will appreciate that other increments, or no increments at all, may be used in the decrease in diameter of the tapered surface.

Figure 3A:
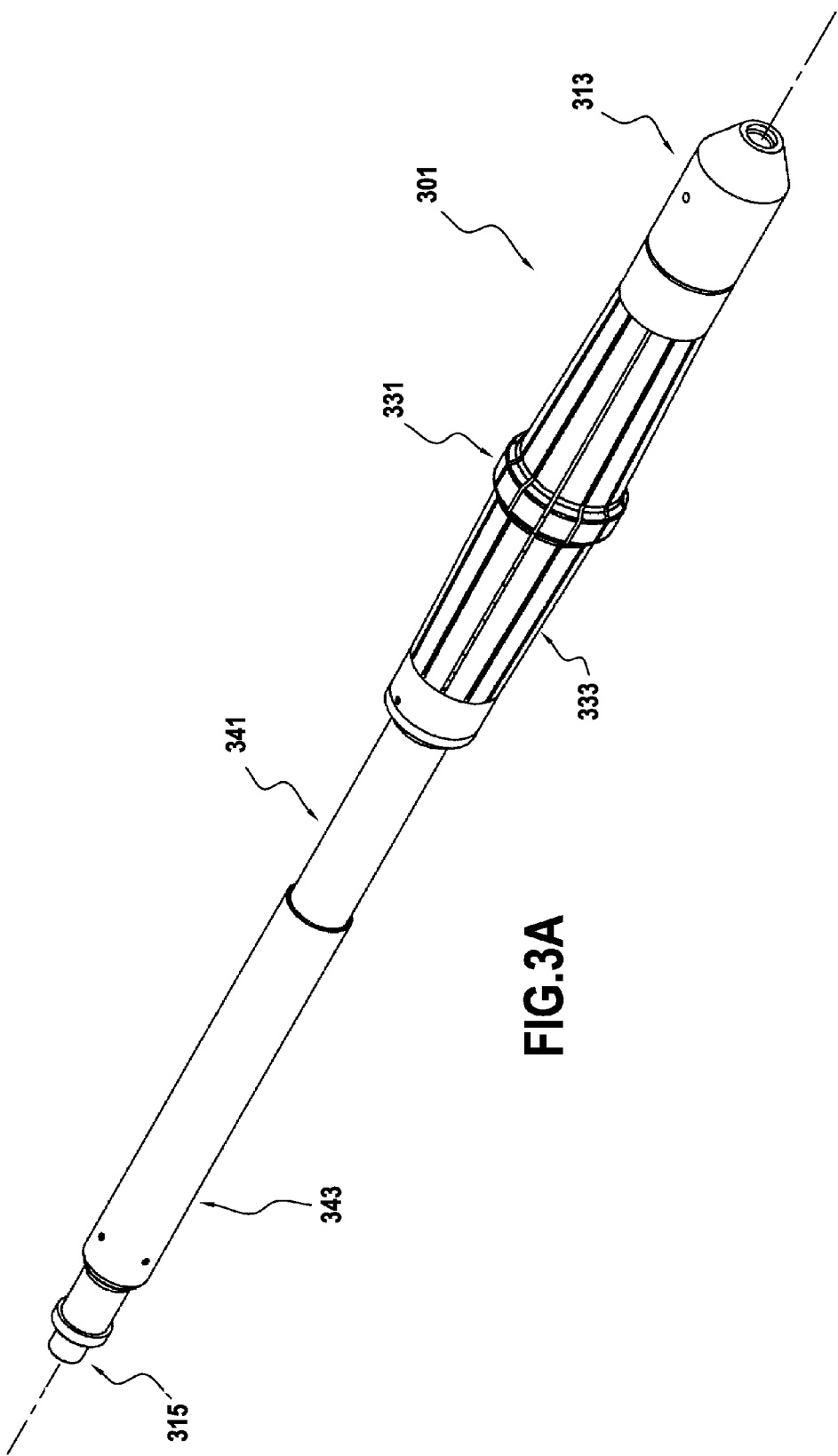

Referring now to FIGS. 3A-3C, another structural depiction is shown of a downhole tool in accordance with one or more embodiments. Particularly, FIG. 3A shows a perspective view of a downhole tool 301, and FIGS. 3B and 3C show cutaway views of the downhole tool 301. As shown, the collet 331 of the downhole tool 301 includes a plurality of arm portions 333 and a plurality of borehole engagement portions 335. However, in the embodiment shown, rather than having the borehole engagement portions 335 disposed at the ends of the arm portions 333 (such as shown in FIGS. 1 and 2A-2C), the borehole engagement portions 335 are disposed within the body of the arm portions 333. As such, the borehole engagement portions 335 are still arranged to engage the tapered surface 317 of the mandrel 311.

Further, in this embodiment, and as noted above, the downhole tool 301 does not have to include a ratcheting mechanism. Rather, the downhole tool 301 may still operate functionally without a ratcheting mechanism, or any other similar mechanism to enable selective movement of the collet 331 with respect to the mandrel 311. As such, in one or more embodiments, the downhole tool 301 may rely on the shear pins to prevent any undesired movement of the collet 331 with respect to the mandrel 311.

As shown in each of the Figures, the downhole tool may include a fishing neck disposed at the first end thereof. This fishing neck may have a threaded connection formed therein (as shown), or may have other mechanisms and tools formed thereon. As such, the fishing neck may be adapted for multiple purposes within a borehole, such as: retrieving other tools, clearing obstructions present within the borehole, and any other functions as are common with fishing equipment. However, those having ordinary skill in the art will appreciate that such fishing necks are not necessary, as a downhole tool in accordance with one or more embodiments may not include a fishing neck.

Embodiments disclosed herein may provide for one or more of the following advantages. First, embodiments disclosed herein may provide a downhole tool that allows a measurement of the diameter of a borehole. For example, by disposing a downhole tool in accordance with embodiments disclosed herein into a borehole, the downhole tool may selectively decrease in diameter to provide a reading of the inner diameter of the borehole. Further, embodiments disclosed herein may provide a downhole tool that increases the efficiency of production for a wellbore. For example, a downhole tool in accordance with embodiments disclosed herein may eliminate the need for multiple runs downhole when drifting a borehole.

Furthermore, it should be understood by those having ordinary skill that the present disclosure shall not be limited to specific examples depicted in the Figures and described in the specification. As such, various mechanisms may be used to expand the arms to the borehole wall without departing from the scope of the present disclosure. While the present disclosure has been described with respect to a limited number of embodiments, those skilled in the art, having benefit of this disclosure, will appreciate that other embodiments may be devised which do not depart from the scope of the disclosure as described herein. Accordingly, the scope of the invention should be limited only by the attached claims.

What is claimed is:

1. A downhole tool for measuring a diameter within a borehole, comprising:
   a mandrel having a first end and a second end with an axis defined therethrough, wherein a tapered surface is formed on an outside surface of the mandrel such that a first end of the tapered surface has a larger diameter than a second end of the tapered surface; and
   a collet disposed about the mandrel such that the collet is configured to move along the axis of the mandrel with respect to the mandrel in a direction from the first end of the mandrel to the second end of the mandrel, wherein the collet includes at least one borehole engagement portion for engaging the borehole.

2. The downhole tool of claim 1, wherein the first end of the tapered surface is disposed closer to the first end of the mandrel than the second end of the tapered surface.

3. The downhole tool of claim 1, wherein the tapered surface comprises a plurality of steps that decrease in diameter in a direction from the first end of the mandrel to the second end of the mandrel.

4. The downhole tool of claim 3, wherein the plurality of steps decrease in diameter at a predetermined increment.

5. The downhole tool of claim 1, wherein the collet comprises deflectable arm portions with a borehole engagement portion attached to each of the deflectable arm portions, wherein the borehole engagement portions are configured to engage the tapered surface of the mandrel.

6. The downhole tool of claim 5, wherein at least one of the borehole engagement portions comprises a tapered surface formed thereon configured to engage the borehole.

7. The downhole tool of claim 1, further comprising shear pins disposed within the mandrel such that the collet is configured to transmit a force to the shear pins.

8. The downhole tool of claim 1, further comprising a bushing with a female groove formed on an inner surface thereof, wherein the mandrel comprises a male groove formed on an outside surface thereof, wherein the female groove engages the male groove such that the collet is prevented from moving along the axis of the mandrel with respect to the mandrel in a direction from the second end of the mandrel to the first end of the mandrel.

9. A method of measuring a diameter within a borehole using a downhole tool comprising a mandrel having a first end, a second end, and an axis defined therethrough; and a collet disposed about the mandrel, the method comprising:
   disposing the downhole tool into the borehole such that the first end of the mandrel enters the borehole before the second end of the mandrel; and
   applying a force to the second end of the downhole tool, upon a portion of the collet contacting an obstruction in the borehole,
   wherein, based on the force applied to the downhole tool, the collet moves along the axis of the mandrel with respect to the mandrel such that an outer diameter of the downhole tool decreases.

10. The method of claim 9, wherein the collet comprises deflectable arm portions with a borehole engagement portion attached to each of the deflectable arm portions, wherein the borehole engagement portions are configured to engage a tapered surface formed on an outside surface of the mandrel.

11. The method of claim 9, wherein the obstruction contacted by the downhole tool is a surface of the borehole.

12. The method of claim 9, wherein the mandrel comprises a plurality of shear pins disposed therein, the method further comprising:
   shearing at least one of the plurality of shear pins with the collet when the force is applied to the downhole tool.

13. A method of manufacturing a downhole tool for measuring a diameter within a borehole, comprising:
   providing a mandrel having a first end and a second end with an axis defined therethrough,
   forming a tapered surface on an outside surface of the mandrel such that a first end of the tapered surface has a larger diameter than a second end of the tapered surface;
   providing a collet for engaging and measuring the diameter of the borehole; and
   disposing the collet about the mandrel such that the collet is configured to move along the axis of the mandrel with respect to the mandrel in a direction from the first end of the mandrel to the second end of the mandrel.

14. The method of manufacturing a downhole tool of claim 13 further comprising:
   disposing the first end of the tapered surface closer to the first end of the mandrel than the second end of the tapered surface.

15. The method of manufacturing a downhole tool of claim 13 further comprising:
   forming, in the tapered surface, a plurality of steps that decrease in diameter in a direction from the first end of the mandrel to the second end of the mandrel.

16. The method of manufacturing a downhole tool of claim 15, wherein the plurality of steps decrease in diameter at a predetermined increment.

17. The method of manufacturing a downhole tool of claim 13 further comprising:
   forming, on the collet, deflectable arm portions with a borehole engagement portion attached to each of the deflectable arm portions,
   wherein the borehole engagement portions are configured to engage the tapered surface of the mandrel.

18. The method of manufacturing a downhole tool of claim 17, further comprising tapering a surface of at least one of the borehole engagement portions configured to engage the borehole.

19. The method of manufacturing a downhole tool of claim 13 further comprising:
   disposing shear pins within the mandrel such that the collet is configured to transmit a force to the shear pins.

20. The method of manufacturing a downhole tool of claim 13, further comprising
   providing a bushing with a female groove formed on an inner surface thereof; and
   forming a male groove on an outside surface of the mandrel,
   wherein the female groove engages the male groove such that the collet is prevented from moving along the axis of the mandrel with respect to the mandrel in a direction from the second end of the mandrel to the first end of the mandrel.

* * * * *